United States Patent

Innis, Jr. et al.

[11] Patent Number: 6,053,501
[45] Date of Patent: Apr. 25, 2000

[54] NECK SEAL

[75] Inventors: Charles L. Innis, Jr., Paxton, Mass.; Jerome J. Churba, Crown Point, Ind.

[73] Assignee: Morgan Construction Company, Worcester, Mass.

[21] Appl. No.: 09/059,862

[22] Filed: Apr. 14, 1998

[51] Int. Cl.⁷ .................................................. F16J 15/32
[52] U.S. Cl. ...................... 277/571; 277/549; 277/552; 277/562
[58] Field of Search ..................... 277/571, 549, 277/552, 560, 562, 563, 564, 565, 566

[56] References Cited

U.S. PATENT DOCUMENTS

| | | | |
|---|---|---|---|
| 3,214,182 | 10/1965 | Herbruggen | 277/210 |
| 4,165,881 | 8/1979 | Salter | 277/152 |
| 4,531,747 | 7/1985 | Miura | 277/134 |
| 4,586,720 | 5/1986 | Simmons et al. | 277/152 |
| 4,822,059 | 4/1989 | Shimasaki et al. | 277/152 |
| 4,834,400 | 5/1989 | Lebeck | 277/236 |
| 4,866,827 | 9/1989 | Benefer et al. | 277/565 |
| 5,083,802 | 1/1992 | Shimasaki et al. | 277/152 |
| 5,127,661 | 7/1992 | Franson et al. | 277/152 |
| 5,129,744 | 7/1992 | Otto et al. | 277/152 |
| 5,186,548 | 2/1993 | Sink | 277/153 |
| 5,348,312 | 9/1994 | Johnston | 277/39 |
| 5,478,090 | 12/1995 | Simmons et al. | 277/565 |
| 5,507,505 | 4/1996 | von-Arndt et al. | 277/208 |
| 5,524,904 | 6/1996 | Willi et al. | 277/152 |

FOREIGN PATENT DOCUMENTS

WO 90/08273A1  7/1990  WIPO.

*Primary Examiner*—Anthony Knight
*Assistant Examiner*—Karlena D. Schwing
*Attorney, Agent, or Firm*—Samuels, Gauthier & Stevens

[57] ABSTRACT

For use in a seal assembly having a nonrotatable component surrounding and spaced radially from a tapered section of a roll neck in a rolling mill, a seal comprising a flexible circular seal body with at least first and second resilient outer circular flanges. The seal body is configured and dimensioned to be mounted on the roll neck for rotation therewith. The first flange has a peripheral lip projecting at an angle therefrom in the direction of the second flange, with a contact surface on the first flange positioned to contact the nonrotatable component. The second flange projects in the same direction at an angle with respect to the first flange and is spaced from the nonrotatable component. The first flange is bendable to an extent sufficient to contact the second flange at a static interface, resulting in the space therebetween being reduced in size and enclosed with respect to the surrounding atmosphere. Surface discontinuities on at least one of the flanges at the static interface accommodate a venting of the thus enclosed space to the surrounding atmosphere.

6 Claims, 2 Drawing Sheets

NECK SEAL

BACKGROUND OF THE INVENTION

1. Field of the Invention

This invention relates generally to flexible seals, and is concerned in particular with an improvement to seals of the type employed on the tapered sections of roll necks journalled for rotation in rolling mill oil film bearings.

2. Description of the Prior Art

FIG. 1 illustrates a prior art neck seal 10 of the type described in U.S. Pat. No. 4,586,720 (Simmons et al.). The seal has a molded flexible circular seal body 12 internally reinforced by an embedded combination of a coiled spring 14 and a steel cable 16. The seal body has oppositely protruding water-side and oil-side lips 18, 20, a first oil-side flange 22 adjacent to a second oil-side flange 24 commonly referred to as a "flinger", and a third water-side flange 26. The flanges 22, 26 are provided respectively with angularly disposed peripheral lips 28, 30. The lip 28 projects from flange 22 in the direction of the second flinger flange 24, which in turn projects in the same direction at an angle with respect to flange 22 to define a space "S" therebetween open to the surrounding atmosphere.

As shown in FIG. 2, the seal 10 is adapted to be mounted on the tapered section 34 of a rolling mill roll neck 36 which in turn is rotatably supported in an oil film bearing. The bearing includes a sleeve 38 fixed to the roll neck by conventional means (not shown) for rotation therewith. The sleeve 38 has an outer cylindrical bearing surface which is journalled for rotation within an interior bearing surface of a fixed bushing 40. The bushing is carried in a bearing chock 42.

The sleeve rotates with the roll neck while the bearing chock and the bushing remain stationary. Highly viscons oil in flooding quantity is fed continuously between the bearing surfaces of the sleeve 38 and bushing 40. A circular extension 44 of the bearing chock provides a sump 46 in which the oil emerging from between the bearing surfaces is continuously collected. Highly viscons oil may be drawn away from the sump through a suitable piping connection (not shown) to be cooled and filtered before being recycled back to the bearing surfaces.

Where the roll is operating under "wet" conditions, water is constantly flooding over the roll barrel 48 and down over its end face 50. In spite of the centrifugal forces which tend to throw the water off of the roll, some of the water tends to work its way along the roll neck in the direction of the bearing. The objective of the seal assembly generally indicated at 52 and the flexible neck seal 10 which forms a component part thereof is to prevent any of the water from infiltrating into the bearing and contaminating the bearing oil while at the same time preventing loss of oil from the bearing.

In addition to the flexible seal 10, the seal assembly 52 includes a rigid circular seal end plate 54 which is mounted on and fixed relative to the bearing chock 42. The seal end plate has a radially inwardly extending rigid circular flange or "dam" 56 which is perpendicular to the bearing axis. The inner edge of the dam is spaced radially from the flexible seal body. The seal end plate further includes shoulders 58 extending in opposite directions from the base of the dam 56. Each of the shoulders 58 has a cylindrical shoulder surface 60 which is parallel to the bearing axis. The cylindrical shoulder surfaces 60 surround the flexible seal flanges 22, 26, and are arranged to be slidingly contacted by their respective flexible lips 28, 30.

The seal assembly 52 also includes an inner seal ring 62 with resilient buttons 64 engaging the end face 50 of the roll. The inner edge of the inner seal ring contacts the flexible seal body 12 at the juncture of the lip 18 and flange 26.

During a rolling operation, the above-described arrangement will operate in the following manner: the inner seal ring 62, flexible neck seal 10 and sleeve 38 will rotate with the roll neck. The seal end plate 54, chock 42 and bushing 40 will remain stationary. Lubricating oil will constantly flow from between the bearing surfaces of the sleeve 38 and bushing 40. Most of this oil will be turned back by the rotation flinger 24 on the neck seal and will thus be directed to the sump 46. Oil which succeeds in passing by the flinger 24 will be turned back by the rotation oil-side flange 22 and will be prevented from escaping between the flange 22 and the shoulder surface 60 by the flexible lip 28 which sealingly engages the shoulder surface. Likewise, the major portion of the water applied to the roll will be turned back by the rotating inner seal ring 62. Any water which succeeds in passing by the inner seal ring will be turned back by the rotating water-side flange 26 on the neck seal and will be prevented from passing between the flange and its surrounding shoulder surface by the flexible lip 30.

Although the above-described arrangement operates in a generally satisfactory manner, experience has indicated that during removal of the bearing assembly from the roll neck, it happens by design that oil-side flange 22 of the seal is engaged by the dam 56 of the seal end plate 54. This occasionally causes the flange 22 to be bent to an extent sufficient to bring it and its peripheral lip 28 into contact with the second flinger flange 24. The space S is thus substantially reduced in size and closed off from the surrounding atmosphere by the lip 28 in contact with flinger flange 24. This condition is illustrated in FIG. 3A. The space S is further reduced in size and sealing from the surrounding atmosphere increased through the presence of residual amounts of the highly viscous oil used to lubricate the bearing.

Thereafter, as depicted in FIG. 3B, when the bearing is remounted on the roll neck and the seal end plate 54 is again located between and spaced axially from both flanges 22, 26, the flange 22 will seek to resiliently return to its normal position but will be prevented from doing so by the development of subatmospheric air pressure in the closed space S. Thus, the lip 28 will remain out of contact with the adjacent seal end plate shoulder surface 60, resulting in leakage of oil. This development of subatmospheric air pressure will be encouraged by the reduction in size of the air space and improvement in sealing from the surrounding atmosphere through the presence of residual amounts of the highly viscous lubricating oil.

SUMMARY OF THE INVENTION

The present invention corrects the above-described deficiency by providing means for introducing air from the surrounding atmosphere into the closed space S, either directly by means of grooves, or indirectly by means of discrete energy-storing protuberances which act to disrupt integrity of contact. This avoids the development of subatmospheric air pressure in the space S, and thus insures the resilient return of the oil-side flange 22 to its normal position, with its lip 28 in sealing contact with the adjacent seal end plate shoulder surface. 60.

DETAILED DESCRIPTION OF THE ILLUSTRATED EMBODIMENTS

Figure 1:
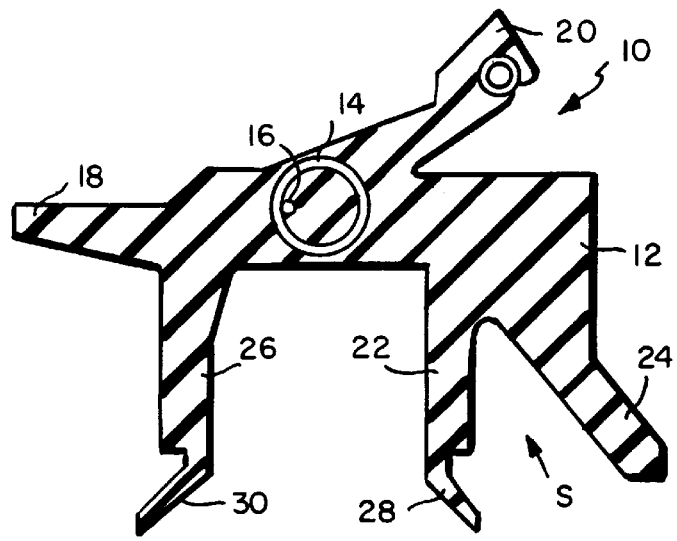
FIG. 1 is a cross-sectional view of a prior art neck seal.
Figure 2:
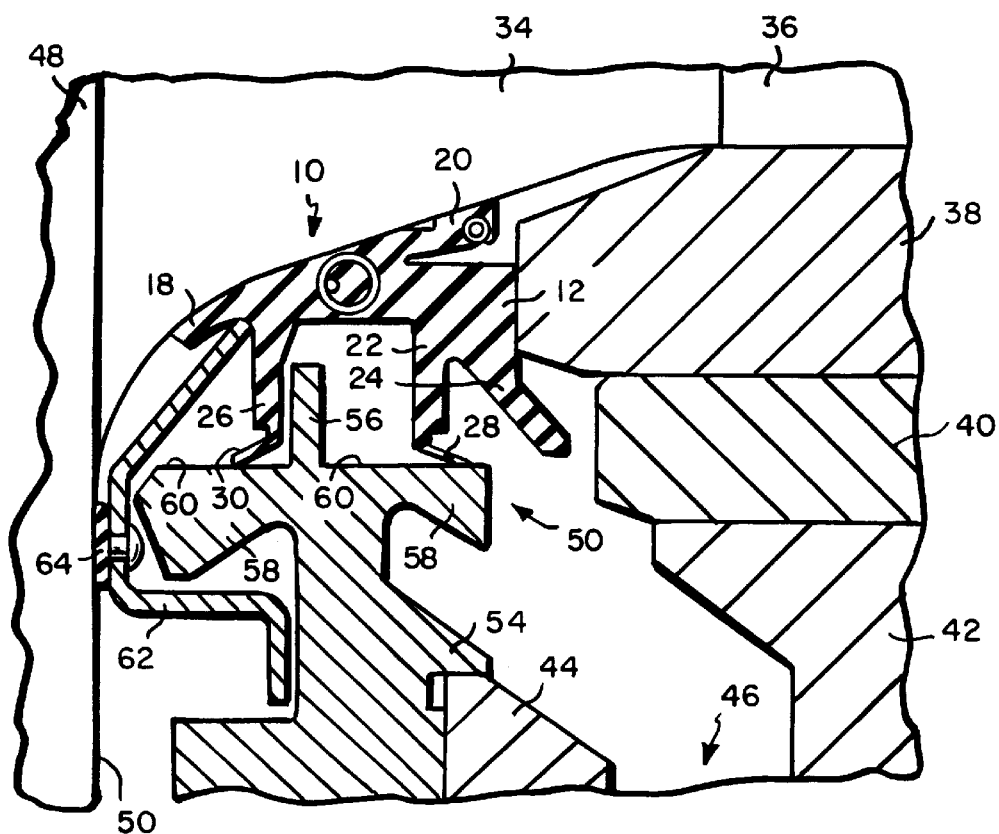
FIG. 2 is a partial cross-sectional view of an oil film bearing and associated seal assembly including the prior art seal shown in FIG. 1.
Figure 3A:
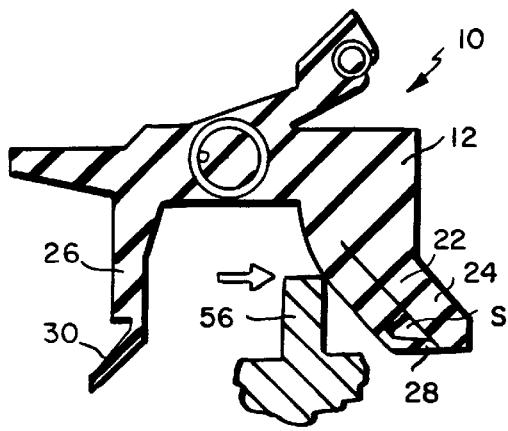
FIG. 3A is a cross-sectional view illustrating how the seal shown in FIG. 1 can be deformed during bearing removal.
Figure 3B:
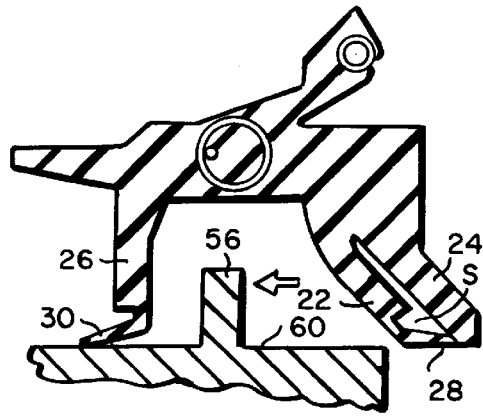
FIG. 3B is a cross-sectional view illustrating how the deformed seal of FIG. 3A is prevented from resiliently returning to its normal shape when the bearing is remounted on the roll neck.
Figure 4A:
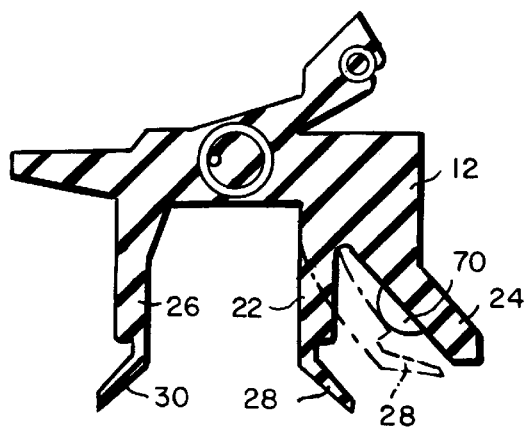
FIGS. 4A–4C are cross-sectional views showing seals modified in accordance with the present invention.

As noted above, the present invention is directed to the introduction of ambient air into the space S closed off by the lip 28 when it contacts the flinger flange 24 during deformation of the oil-side flange 22. In the embodiment illustrated in FIG. 4A, this is accomplished by locating circumferentially spaced hemispherical protuberances 70 on the inner surface of the flinger flange 24. If the oil-side flange 22 is bent towards the flinger flange 24, as depicted by the broken lines, it will contact the protuberances 70. Compression of the protuberances will cause energy to be stored elastically while the flange remains constrained in the bent position. Once the constraint which causes the bending of the flange is removed, such as by movement of the surrounding parts, the stored energy will be dissipated by expansion of the protuberances to the uncompressed state, thus opening a gap between the seal lip and the flinger flange and allowing ambient air to enter space S between the protuberances, which in turn will prevent development of subatmospheric air pressure in space S.

Figure 4B:
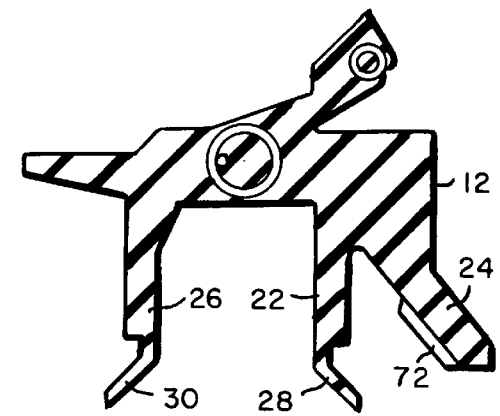
Figure 4C:
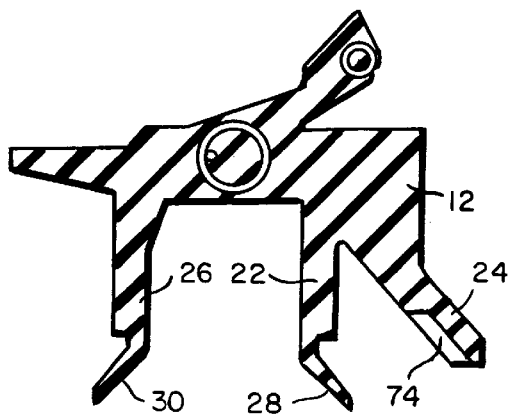

In FIG. 4B, circumferentially spaced radial ridges 72 are provided on the inner surface of flinger flange 24, and in FIG. 4C, the inner surface of the flinger flange is interrupted by radial grooves 74. These, as well as other equivalent surface discontinuities at the contact interface between the lip 28 and the flinger flange 24, serve to prevent the development of subatmospheric pressure in space S, which in turn insures that the oil-side flange 22 always returns to its normal position, regardless of whether it is resiliently deformed during bearing removal.

In light of the foregoing, it will now be apparent to those skilled in the art that various modifications can be made to the disclosed embodiments without departing from the invention as herein claimed. For example, surface discontinuities may be provided on the inner surface of the flinger flange 24 and/or on the facing surface of the oil-side flange 22 and/or its peripheral lip 28. The surface discontinuities can be of any shape, provided that they accommodate the necessary ingress of ambient air into the space S when the lip 28 is in contact with the flinger flange 24. Alternatively, passageways can be drilled or molded into the flinger flange 24 at strategic locations.

We claim:

1. For use in a seal assembly having a nonrotatable component surrounding and spaced radially from a tapered section of a roll neck in a rolling mill, a seal comprising a flexible circular seal body with at least first and second resilient outer circular flanges, said seal body being configured and dimensioned to be mounted on said roll neck for rotation therewith, said first flange having a peripheral lip projecting at an angle therefrom in the direction of said second flange, said lip having a contact surface positioned to contact said nonrotatable component, and said second flange projecting in the same direction at an angle with respect to said first flange and being spaced from said nonrotatable component to cooperate with said first flange in defining a space therebetween open to the surrounding atmosphere, said first flange being bendable to an extent sufficient to contact said second flange at a static interface, resulting in said space being reduced in size and enclosed with respect to the surrounding atmosphere, and means on at least one of said flanges at a location remote from the contact surface of said lip for venting the thus enclosed space to the surrounding atmosphere.

2. The seal as claimed in claim 1 wherein said means is located at said static interface.

3. The seal as claimed in claim 2 wherein said means comprises radial grooves in said second flange.

4. The seal as claimed in claim 2 wherein said means comprises radial ridges in said second flange.

5. The seal as claimed in claim 2, wherein said meaws comprises surface discontinties at said static interface.

6. The seal as claimed in claim 5 wherein said surface discontinuities comprise protuberances which elastically store energy when compressed at said static interface.

* * * * *